United States Patent
Kageyama

(10) Patent No.: US 9,942,611 B2
(45) Date of Patent: Apr. 10, 2018

(54) METHODS AND SYSTEMS FOR DISPLAYING A COUNTDOWN ALERT FOR CHILDREN

(71) Applicant: Rovi Guides, Inc., Santa Clara, CA (US)

(72) Inventor: Tsuyoshi Kageyama, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/976,370

(22) Filed: Dec. 21, 2015

(65) Prior Publication Data
US 2017/0180808 A1    Jun. 22, 2017

(51) Int. Cl.
| H04N 21/475 | (2011.01) |
| G06F 3/0482 | (2013.01) |
| H04N 21/81 | (2011.01) |
| H04N 21/45 | (2011.01) |
| H04N 21/488 | (2011.01) |
| H04N 21/431 | (2011.01) |

(52) U.S. Cl.
CPC ....... *H04N 21/4751* (2013.01); *G06F 3/0482* (2013.01); *H04N 21/4316* (2013.01); *H04N 21/4532* (2013.01); *H04N 21/4882* (2013.01); *H04N 21/8146* (2013.01)

(58) Field of Classification Search
CPC ........... H04N 21/4751; H04N 21/4316; H04N 21/4532; H04N 21/4882; H04N 21/8146; G06F 3/0482
See application file for complete search history.

(56) References Cited

U.S. PATENT DOCUMENTS

| 6,388,665 B1 * | 5/2002 | Linnett | G06F 3/04817 345/473 |
| 8,049,605 B2 | 11/2011 | Caspe-Detzer et al. | |
| 9,148,698 B1 * | 9/2015 | Jaini | H04N 21/4751 |
| 2004/0078814 A1 * | 4/2004 | Allen | H04N 5/44513 725/47 |
| 2008/0046584 A1 * | 2/2008 | Tucker | H04N 7/163 709/231 |
| 2010/0083308 A1 * | 4/2010 | Chang | H04N 7/17318 725/37 |
| 2014/0329212 A1 * | 11/2014 | Ruman | G09B 19/0076 434/236 |

FOREIGN PATENT DOCUMENTS

CN    1885903 A    12/2006

* cited by examiner

*Primary Examiner* — Robert Hance
*Assistant Examiner* — Susan X Li
(74) *Attorney, Agent, or Firm* — Haley Guiliano LLP

(57) ABSTRACT

Methods and systems are disclosed herein for creating countdown animations. The countdown animations may alert children that they are approaching their viewing limits, wherein the viewing limits are set by parents and/or guardians. A method may include generating a countdown of an amount of time remaining in a user selected period of time for accessing media content. The method may include identifying a character of a plurality of characters based on a user criterion. The method may include searching a database of a plurality of countdown animations to select a countdown animation associated with the identified character. The method may include generating for display the selected countdown animation simultaneously with the media content.

22 Claims, 8 Drawing Sheets

METHODS AND SYSTEMS FOR DISPLAYING A COUNTDOWN ALERT FOR CHILDREN

BACKGROUND

Children often wish to view more television than parents and/or guardians feel comfortable with. Parents and/or guardians may wish to restrict the children's screen time in order to make sure children have enough time to complete their homework, engage in physical activities, finish their chores, spend mealtime with their families, and pursue their hobbies. However, children may become upset when parents and/or guardians restrict their access to the television because such restriction may seem sudden and unfair to the children. Parents and/or guardians may want an effective method of imposing viewing limits on their children's screen time without upsetting their children.

SUMMARY

Accordingly, methods and systems are disclosed herein for an effective method of imposing viewing limits on a child's screen time without upsetting the child. Specifically, a media guidance application may create custom countdown animations featuring a character enjoyed by the child. By using the character to communicate the viewing limits, the media guidance application imposes the viewing limit in a less confrontational format. The media guidance application may generate for display countdown animations on user devices used by children to alert the children that they are approaching their viewing limits. Viewing limits may have been set by parents and/or guardians to restrict how long children can access media content and/or media devices. In some aspects, a method may include the media guidance application generating a countdown of the amount of time remaining in a user selected period of time for accessing media content. The user selected period of time for accessing media content may be a viewing limit set by parents and/or guardians. For example, the user selected period of time for accessing media content may be one hour per day. The countdown may measure the amount of time remaining in the viewing limit. The method may include the media guidance application identifying a character of a plurality of characters based on a user criterion. The user criterion may be one of an attribute of a user profile, an identifier of the media content, or an attribute of previously entered user preferences. For example, the media guidance application may identify the character "Dora" because a user is currently watching the cartoon program "Dora the Explorer." The method may include the media guidance application searching a database of a plurality of countdown animations to select a countdown animation associated with the identified character. For example, the media guidance application may select a countdown animation associated with "Dora". The method may include the media guidance application generating for display the selected countdown animation simultaneously with the media content. The media guidance application may generate for display the countdown animation as an overlay on the media content, side-by-side with the media content, or simultaneously with a soundtrack associated with the selected countdown animation. For example, the media guidance application may generate for display a countdown animation associated with the character "Dora" as an overlay on the cartoon program "Dora."

In some embodiments, the method may include the media guidance application generating for display a countdown of the amount of time remaining in the user selected period. For example, the media guidance application may generate for display a countdown from 03:00 to 00:00 between the time when three minutes remain in the viewing limit and no time remains in the viewing limit.

In some embodiments, the method may include the media guidance application identifying the character by comparing an attribute associated with each character of the plurality of characters to the user criterion, and selecting the character of the plurality of characters associated with an attribute matching the user criterion. For example, the media guidance application may compare the user criterion of "Dora the Explorer" to attributes of each animation in a database, and select the character "Dora" because it has a matching attribute of "Dora the Explorer." In some embodiments, the method may include the media guidance application identifying the character by searching user criteria associated with each of previously selected characters of the plurality of characters, and selecting the character of the previously selected characters associated with an attribute matching the user criterion. For example, the media guidance application may have previously selected the character "Dora" in association with the user criterion "Dora the Explorer," and stored this association in a cache. The media guidance application may select the character "Dora" again in association with the user criterion "Dora the Explorer" based on the information stored in the cache.

In some embodiments, the method may include the media guidance application performing a user-selected action at an end of the countdown of the amount of time remaining in the user selected period of time. For example, when the countdown reaches zero, the media guidance application may generate for display an alert box with a reminder such as "Meal Time," "Homework Time," or "Time to turn off TV." In another example, when the countdown reaches zero, the media guidance application may lock the media content and generate for display a parental control lock screen that requires a parental control code to be entered to unlock the screen. In some embodiments, the media guidance application may lock the user device instead of, or in addition to, the media content.

In some embodiments, the method may include comparing the countdown of the amount of time to a threshold time, and generating for display the countdown animation when the countdown of the amount of time is less than the threshold time. For example, if the countdown of the amount of time is 11 minutes, and the threshold time is 10 minutes, the media guidance application may not generate for display any countdown animation. In another example, if the countdown of the amount of time is 9 minutes, and the threshold time is 10 minutes, the media guidance application may generate for display the countdown animation, to give the children, at most, a ten minute warning that their viewing limit is going to be reached.

BRIEF DESCRIPTION OF FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
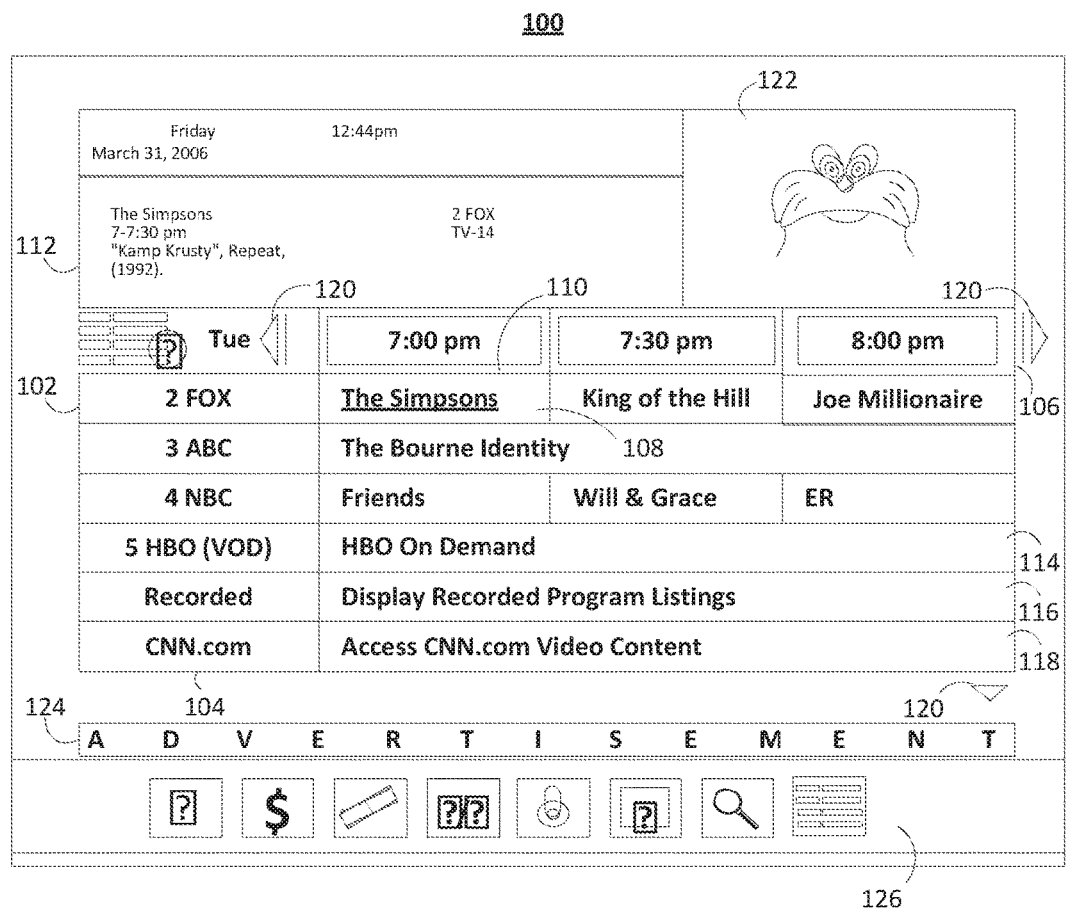
FIG. 1 shows an illustrative example of a display screen generated by a media guidance application in accordance with some embodiments of this disclosure.

Children may become upset when they feel their access to television or another similar media device has been suddenly restricted. However, they may react better to viewing limits if they receive sufficient advance warning that they are reaching their viewing limits. Also, parents and/or guardians may appreciate methods and systems for imposing viewing limits that does not upset their children and can be easily and reliably applied. The methods and systems described in this disclosure may be implemented by a media guidance application implemented on control circuitry 304, and other components as described in relation to FIG. 3.

As referred to herein, "children" refers to a person or group of people for whom viewing limits have been set. As referred to herein, "parents" and/or "guardians" refers to a person or group of people who have set viewing limits for children. As referred to herein, "viewing limits" refer to the total amount of time children are allowed to access media content and/or media devices such as user television equipment 402, user computer equipment 404, or wireless user communication device 406. In some embodiments, viewing limits may be measured at a single device. For example, parents may set viewing limits at a television to be one hour per day. In some embodiments, parents may set viewing limits across devices. For example, parents may set viewing limits for a certain child to be two hours per day maximum, across devices such as computers, televisions, gaming consoles, and/or music players. Viewing limits may be set in terms such as minutes per day, hours per day, minutes per device, or hours per month.

In some embodiments, countdown animations may be used to inform children that their viewing limits are being reached. These countdown animations may include animations of characters that children are familiar with, which may cause the children to feel less upset about reaching their viewing limit. As referred to herein, characters include cartoon characters, television show characters, objects, and people that are used as a pictorial element of a countdown.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
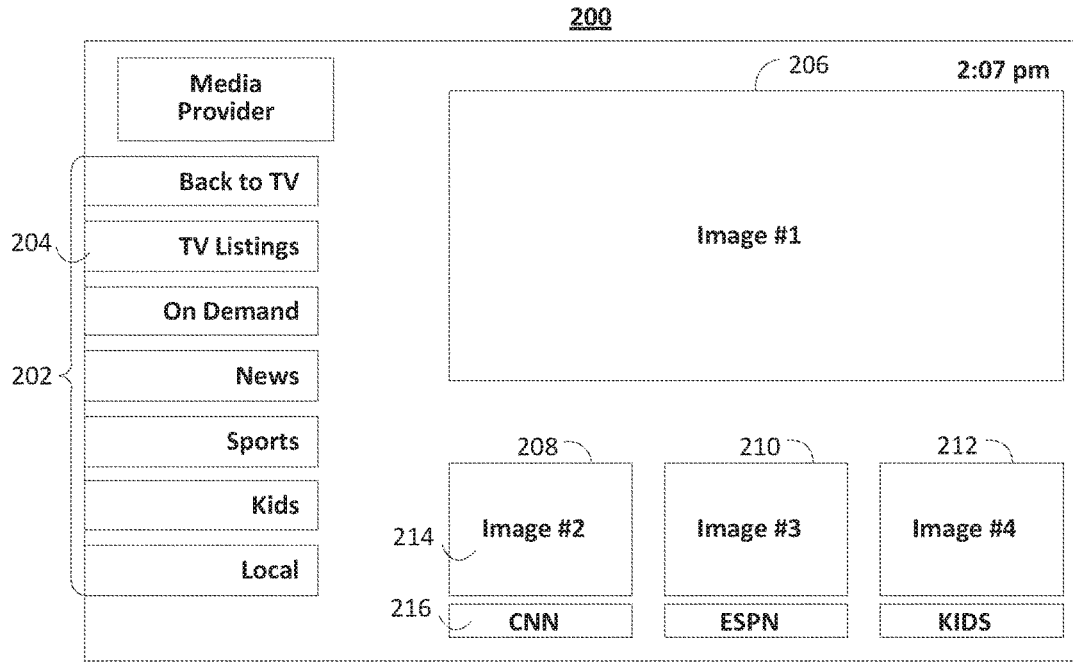
FIG. 2 shows another illustrative example of a display screen generated by a media guidance application in accordance with some embodiments of this disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
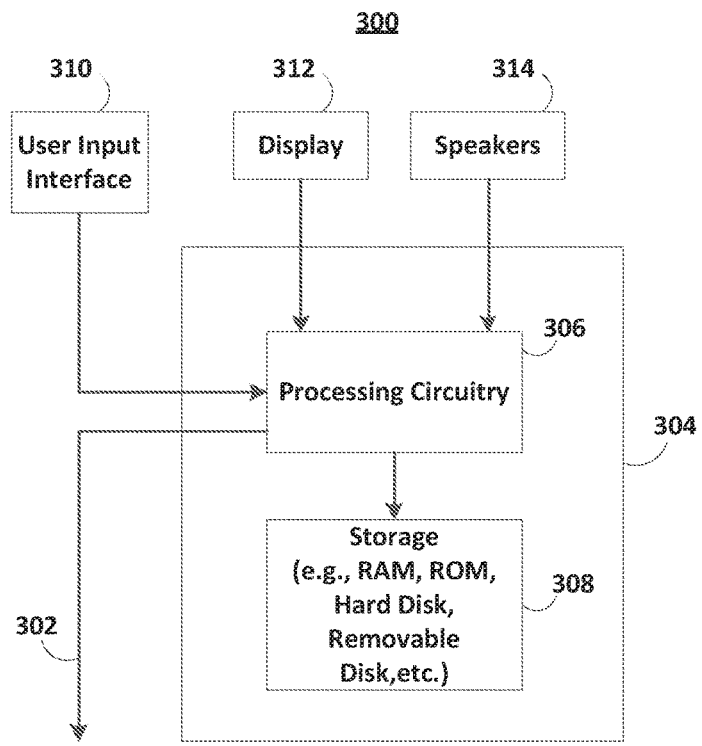
FIG. 3 is a block diagram of an illustrative user equipment device in accordance with some embodiments of this disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
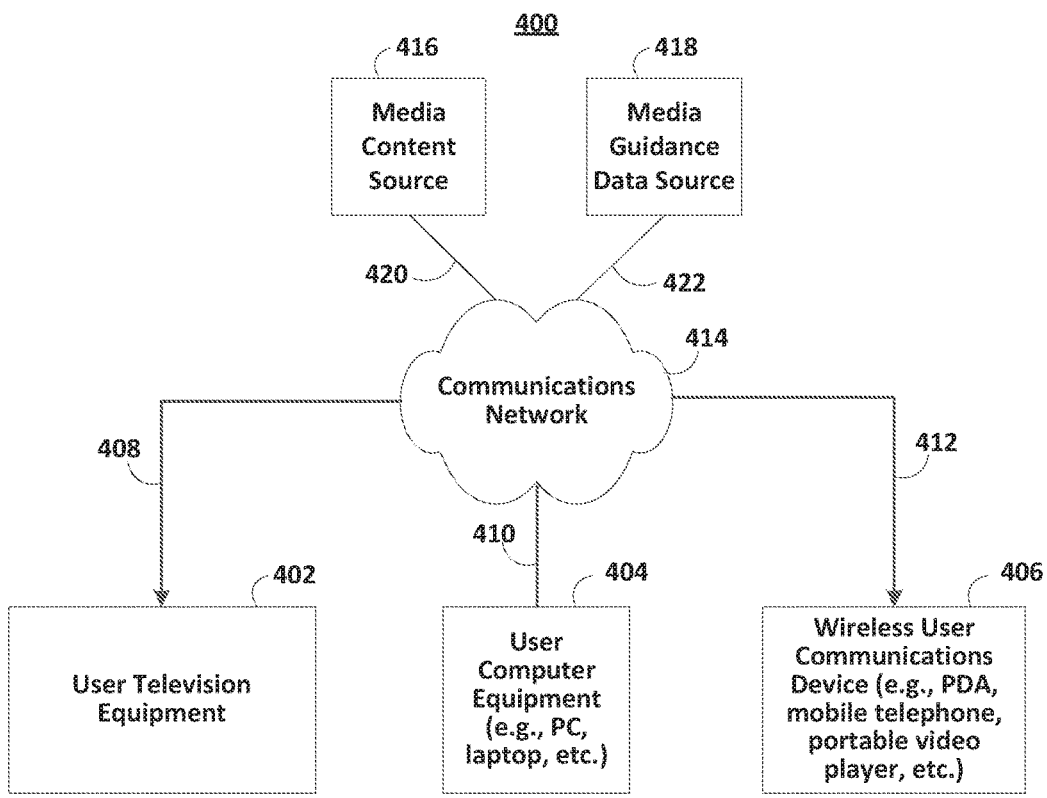
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
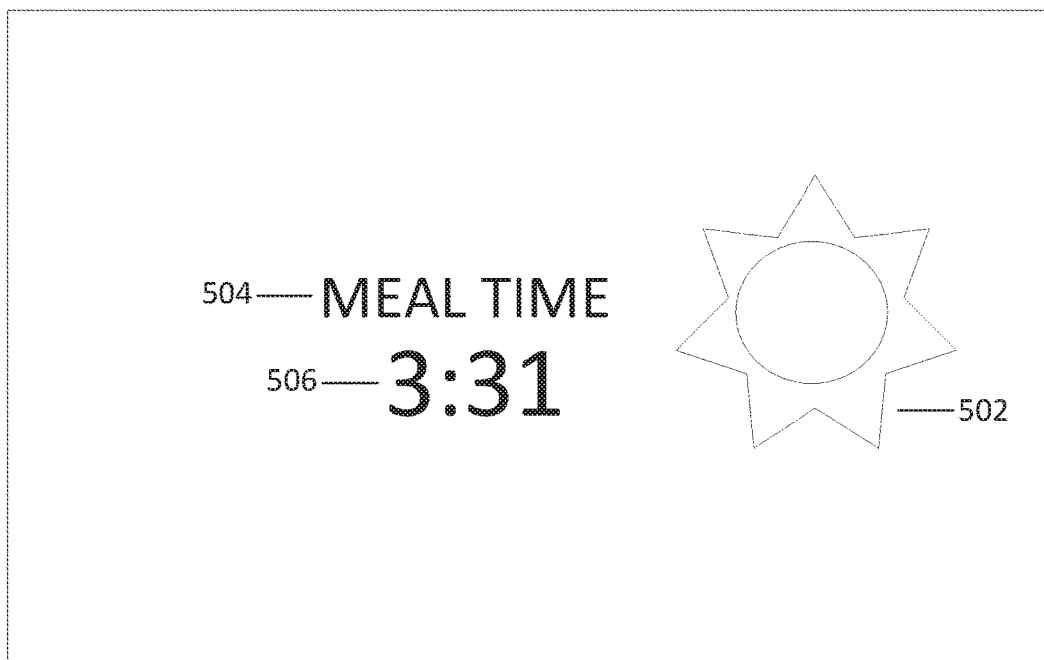
FIG. 5 shows an illustrative countdown animation screen in accordance with some embodiments of this disclosure.

FIG. 5 shows an illustrative countdown animation screen incorporating embodiments of this disclosure. Countdown animation screen 500 may be displayed on any of user television equipment 402, user computer equipment 404, or wireless user communications device 406 using display 312. In some embodiments, countdown animation screen 500 may be accompanied by a soundtrack output using speakers 314.

Countdown animation screen 500 may include character 502. As shown in FIG. 5, character 502 is a flower. Character 502 may be animated. For example, the flower of character 502 may spin, change in size, change in color, or display a blooming animation by changing from a bud to a flower. In some embodiments, character 502 may comprise a looping animation. In some embodiments, character 502 may be animated for a preset amount of time and then become a still picture.

Countdown animation screen 500 may include text 504. Text 504 may include a reason for the countdown. For example, as shown in FIG. 5, the media guidance application may generate for display countdown animation screen 500 to inform children that their meal time is approaching. The media guidance application may receive text 504 entered by parents and/or guardians when they enter their user preferences for countdown animation screen 500. In some embodiments, text 504 may be animated. For example, text 504 may spin, move as a marquee, float, or change colors.

Countdown animation screen 500 may include countdown value 506. Countdown value 506 may be represented in formats such as dd:hh:mm:ss, hh:mm:ss, or mm:ss. As shown in FIG. 5, countdown value 506 indicates that three minutes and thirty-one seconds of the viewing limit are remaining. The media guidance application may update countdown value 506 as the time remaining changes until the viewing limit is reached. In some embodiments, character 502 may change its animation as countdown value 506 changes. For example, character 502 may spin slowly if countdown value 506 is more than a minute, but spin fast if countdown value 506 is less than or equal to a minute.

In some embodiments, the media guidance application may generate for display character 502, text 504, and countdown value 506 as an overlay on the media content being displayed on countdown animation screen 500. In some embodiments, the media guidance application may generate for display character 502, text 504, and countdown value 506 alongside the media content.

In some embodiments, after countdown value 506 reaches 0, the media devices of the children turn off. In some embodiments, after countdown value 506 reaches 0, parents receive a notification on one of user television equipment 402, user computer equipment 404, or wireless user communications device 406 that their children have reached their viewing limits. In some embodiments, after countdown value 506 reaches 0, the soundtrack being output through speakers 314 changes. In some embodiments, after countdown value 506 reaches zero, an alert box is displayed as described in relation to FIG. 6.

Figure 6:
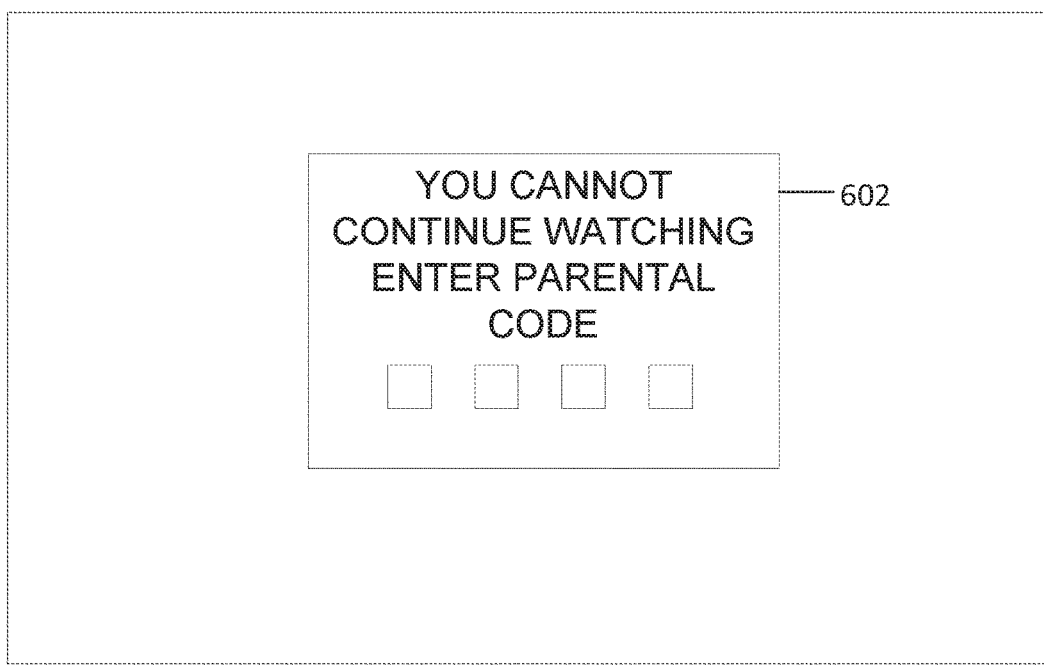
FIG. 6 shows an illustrative alert box screen to be displayed after countdown value has reached zero in accordance with some embodiments of this disclosure.

FIG. 6 shows an illustrative alert box screen 600 to be displayed after countdown value 506 has reached zero, incorporating embodiments of this disclosure. In some embodiments, alert box 602 may only be displayed on the media device most recently accessed by the children. In some embodiments, the media guidance application may generate for display alert box 602 on user television equipment 402, user computer equipment 404, and wireless user communications device 406.

In some embodiments, alert 602 box may include text. For example, alert box 602 may include default text such as "You cannot continue watching." In some embodiments, alert box 602 may include text related to text 504. For example, alert box 602 may include text such as "You cannot continue watching. It is mealtime." In some embodiments, media content may be paused and the media guidance application may generate for display alert box 602 overlaid on the paused media content. In some embodiments, the media guidance application may generate for display alert box 602 to take up all space available on display 312.

In some embodiments, alert box 602 may include an option to enter a parental control code (also referred to as parental code). Control circuitry 304 may generate for display the option to enter a parental control code based on user preferences. If a user correctly enters in the parental control code using user input interface 310, the user may be allowed to access the media content again. In some embodiments, the media guidance application may reset the viewing limits if a correct parental control code is entered.

Figure 7:
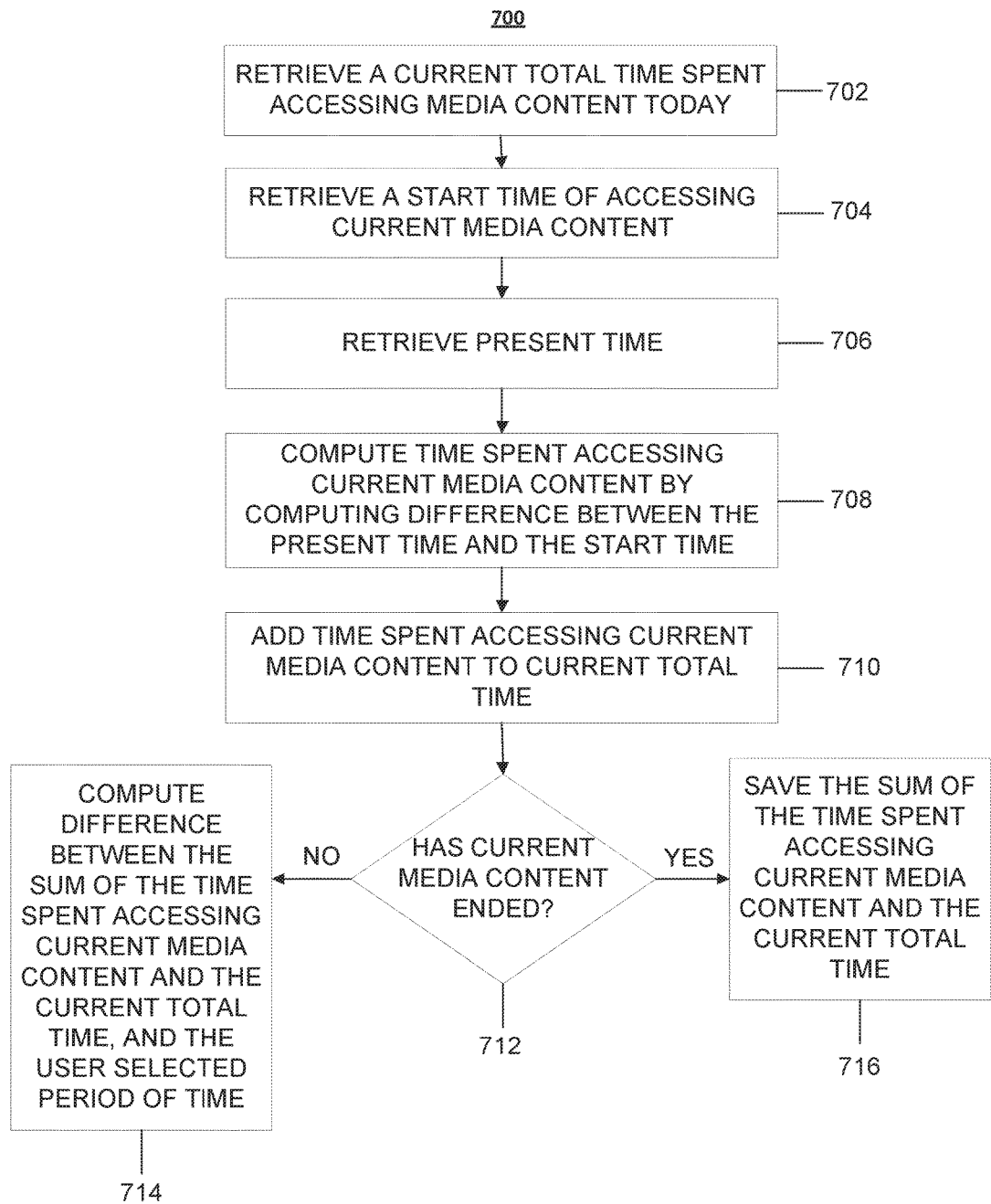
FIG. 7 shows an exemplary process for generating a countdown of the amount of time remaining in a user selected period of time for accessing media content in accordance with some embodiments of this disclosure.

FIG. 7 shows an exemplary process 700 for generating a countdown of the amount of time remaining in a user selected period of time for accessing media content incorporating embodiments of this disclosure. Process 700 may also be used to generate a countdown of the amount of time remaining in a user selected period of time for accessing one or more media devices.

At block 702, control circuitry 304 retrieves, using storage circuitry 308, a current total time spent accessing media content today. The current total time spent may be represented using any measure of time, such as seconds, minutes, or hours. In some embodiments, control circuitry 304 may retrieve time spent accessing media devices. In some embodiments, control circuitry 304 may retrieve time spent accessing media content or media devices over more than one day, or less than one day, based on the viewing limits. For example, if parents and/or guardians set viewing limits that children are allowed to access media devices for six hours every week, control circuitry 304 may retrieve the current total time spent accessing media devices this week.

At block 704, control circuitry 304 retrieves the start time of accessing media content. The media content may refer to the currently accessed media content. For example, if a child began accessing the currently-watched cartoon show at 7:02 am, control circuitry 304 may retrieve a start time of 7:02 am. In some embodiments, the currently accessed media content may be a movie, television show, computer game, video game, music, or book.

At block 702, control circuitry 304 retrieves a present time. In some embodiments, control circuitry 304 retrieves a present time using an internal clock. In some embodiments, control circuitry 304 retrieves a present time from an external source, such as time.gov, using communications network 414. In some embodiments, control circuitry 304 may store the retrieved first time and present time in registers to easily perform computations with them in block 708.

At block 708, control circuitry 304 computes the time spent accessing the current media content by finding the difference between the present time and the first time. For example, control circuitry 304 may determine that the present time is 7:15 am and the first time is 7:02 am. Control circuitry may subtract the first time from the present time to determine that the time spent accessing the current media content is 13 minutes. In some embodiments, control circuitry 304 may compute the difference in other units of time, such as seconds or hours.

At block 710, control circuitry 304 adds the time spent accessing the current media content to the current total. For example, control circuitry 304 may determine that the viewing limits set by parents and/or guardians are one hour per day. Control circuitry 304 may retrieve, at block 702, a current total time spent accessing media content today: 33 minutes. Control circuitry 304 may further compute that time spent accessing the current media content is 13 minutes. Control circuitry 304 may add the two time durations to compute a result of 46 minutes.

At block 712, control circuitry 304 determines whether the current media content has ended. For example, if the media content is a broadcast television program, the media content may end when its scheduled broadcast time is over. In another example, if the media content is video-on-demand, it may end once the user has paused or stopped its playback. If control circuitry 304 determines that the current media content has ended, process 700 proceeds to block 716. If control circuitry 304 determines that the current media content has not ended, process 700 proceeds to block 714.

At block 714, control circuitry 304 computes a difference between the sum of the current total time and time spent accessing the current media content, and the user selected period of time. The user selected period of time may be the viewing limits set by parents and/or guardians. For example, control circuitry 304 may compute a difference between a sum of the current total time and time spent accessing the current media content (46 minutes) and the user selected period of time (60) to determine the difference is 14 minutes. The difference may represent the value of the countdown.

At block 716, control circuitry 304 saves, using storage circuitry 308, the sum of the current total time and time spent accessing the current media content. Control circuitry 304 may store this new value to replace the value retrieved in block 702. In a next iteration of process 700, control circuitry 304 may retrieve this newly stored value as the current total time spent accessing media content today.

Figure 8:
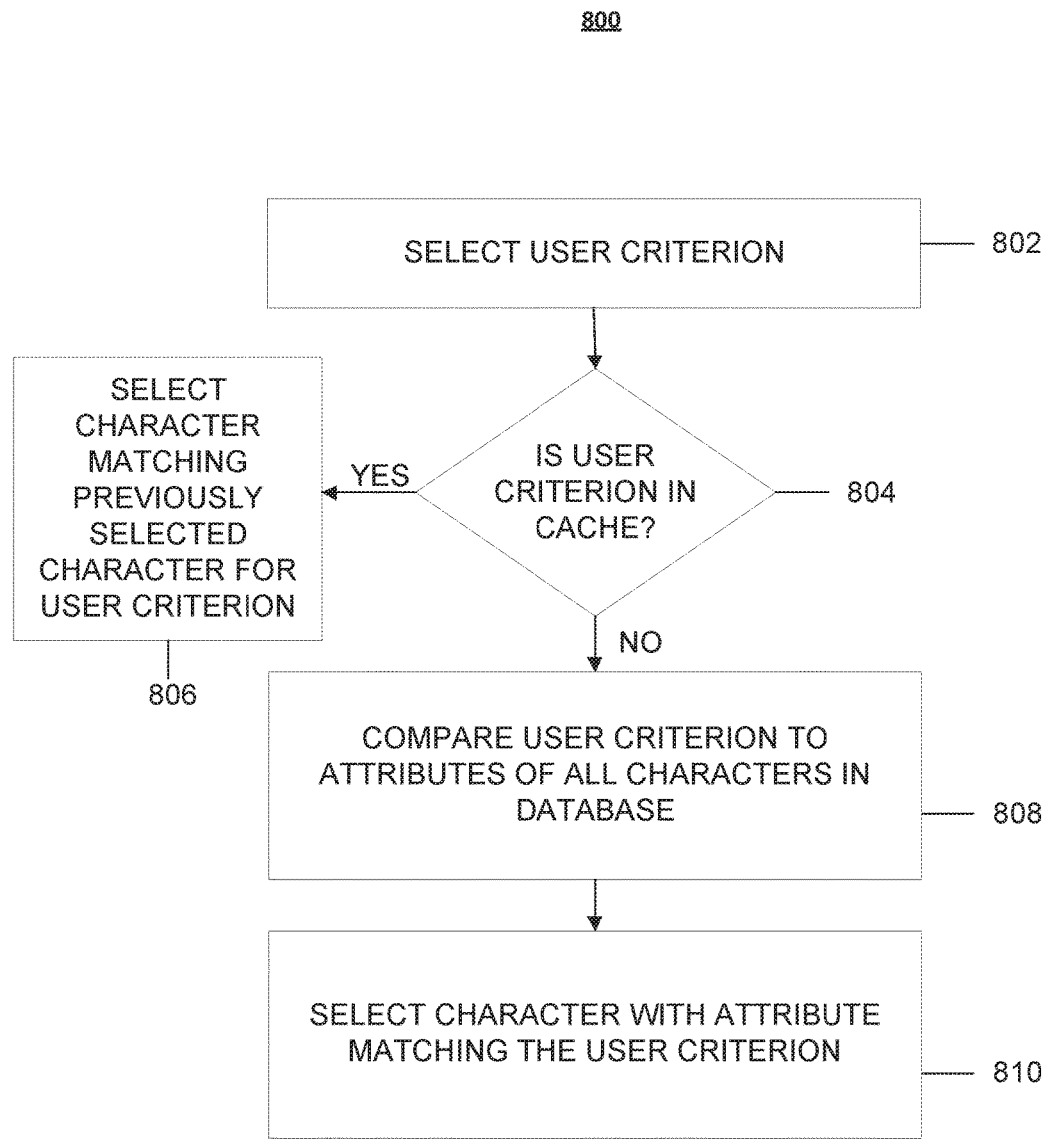
FIG. 8 shows an exemplary process for identifying a character of a plurality of characters based on a user criterion in accordance with some embodiments of the present disclosure.

FIG. 8 shows an exemplary process 800 for identifying a character of a plurality of characters based on a user criterion incorporating embodiments of the present disclosure. At block 802, control circuitry 304 selects, from storage circuitry 308, a user criterion based on any information such as one of the attributes of a user profile, an identifier of media content, or an attribute of previously entered user preferences.

In some embodiments, control circuitry 304 may select the user criterion from a user profile. The user profile may be any collection of user information including both information provided by the user and information collected by the media guidance application. For example, the user profile may store information about media content the user has marked as a favorite, a user's demographics, a user's scheduled media recordings, or a user's favorite genres. The media guidance application may determine the user criterion using any of this information. If control circuitry 304 retrieves a user profile that includes information that a user's favorite genre is "romance," then the user criterion used to identify the character may be "romance." In some embodiments, information in the user profile is ranked in order of importance, based on a predetermined ranking. Control circuitry 304 may select the user criterion to be the most important information in the user profile. For example, a user profile may include information that a user likes cartoons, and that the user is between 21-49 years old. Control circuitry 304 may give the first information higher priority in the user profile than the second, and, hence, control circuitry 304 may determine that the user criterion is that the user likes cartoons.

In some embodiments, control circuitry 304 may select the user criterion from an identifier of the media content. The identifier of the media content may be an identifier of currently accessed media content. For example, if a user is watching a cartoon show "Dora the Explorer," the user criterion may be an identifier of the cartoon show "Dora the Explorer." In some embodiments, the identifier of the media content may be an identifier of previously accessed media content. For example, if a user previously watched a cartoon show "Scooby Doo," the user criterion may be an identifier of the cartoon show "Scooby Doo." Accessing media content may include watching, recording, purchasing, or looking at information about media content. Media content access may be tracked across multiple devices associated with the children and their parents and/or guardians. In some embodiments, control circuitry 304 may give more recently watched media content a higher priority than media content that has not been recently watched. Hence, if control circuitry 304 determines that a user is watching "Dora the Explorer" and previously watched "Scooby Doo," control circuitry 304 may choose the user criterion to be an identifier of "Dora the Explorer." In some embodiments, control circuitry 304 may use only media content given a parental control rating appropriate for children to determine the user criterion.

In some embodiments, control circuitry 304 may select the user criterion from an attribute of a previously entered user preference. For example, control circuitry 304 may have received user preferences, using user input interface 310, from parents and/or guardians when they set up the viewing limits. The user preferences may include attributes such as which television shows should be used to generate countdown animations. For example, user preferences may state that the cartoon character "Mickey Mouse" should be used to generate countdown animations. Control circuitry 304 may use "Mickey Mouse" as the user criterion.

In some embodiments, control circuitry 304 may select the user criterion from a list of frequently accessed media content. Storage circuitry 308 may include a list of frequently accessed media content that is updated every time a user watches, records, purchases, looks at information about, or otherwise accesses media content on any of user television equipment 402, user computer equipment 404, or wireless user communications device 406. Control circuitry 304 may process this list periodically to change the ranking of the media content in the list such that more frequently accessed media content is ranked higher than less frequently accessed media content. In some embodiments, control circuitry 304 may prune the list by removing the less frequently accessed media content from the list. Control circuitry 304 may choose a highly ranked media asset from this list as the user criterion. For example, control circuitry 304 may determine a child watches "Dora the Explorer" every day at 5:00 pm, and hence rank "Dora the Explorer" highly in the list of frequently accessed media content stored using storage circuitry 308. Control circuitry 304 may select "Dora the Explorer" as the user criterion based on its high rank in the list of frequently accessed media content.

In some embodiments, control circuitry 304 may select the user criterion based on a time of day. For example, control circuitry 304 may use its internal clock to determine the current time is "morning," and hence select "energetic" to be the user criterion. In another example, control circuitry 304 may use its internal clock to determine the current time is "night," and hence select "sleepy" to be the user criterion. This may allow children to see energetic animations that increate their excitement when they are going to school, and see sleepy animations that let them know bedtime is coming up when it's time for them to sleep. A lookup table with associations between different times of the days and associated attributes to be used as the user criterion may be stored using storage circuitry 308. Similarly, the lookup table may also store, using storage circuitry 308, associations between the different seasons or months and associated attributes to be used as the user criterion. For example, control circuitry 304 may use an internal calendar to determine the current month is "June" and hence select "warm" as the user criterion using the lookup table. In another example, control circuitry 304 may use an internal calendar to determine the current season is "winter" and hence select "snow" as the user criterion.

In some embodiments, control circuitry 304 may select the user criterion based on the alert text provided by the parents and/or guardians through user input interface 310. Control circuitry 304 may parse the alert text to select words or phrases that are used as the user criterion. For example, control circuitry 304 may receive, from user input interface 310, the alert text "Meal Time," entered by parents and/or guardians. Control circuitry 304 may parse the received alert text to select the user criterion "meal." Other similar user criteria may include "homework" from the alert text "Homework Time," "bed" from the alert text "Bedtime," and "play" from the alert text "Time to go outside to play."

In some embodiments, control circuitry 304 may select the user criterion using the parental control settings. By doing so, control circuitry 304 may be able to ensure that only characters and animations appropriate for children are identified. Parental control settings may be set by parents and/or guardians using user input interface 310, to restrict media content access for children. Parental control settings may be stored in storage circuitry 308. Parental control settings may be communicated to and shared among multiple devices using communications network 414. For example, control circuitry 304 may retrieve, using storage circuitry 308, parental control settings that state access to media content given a rating of higher than "PG" (parental guidance suggested) should be restricted unless a parental code is entered. Control circuitry 304 may select the parental control setting "PG" to use as the user criterion.

In some embodiments, control circuitry 304 may select a user criterion based on advertiser preferences. Advertisers may pay to ensure they can provide advertisement criterion to be used as user criterion in process 800. Control circuitry 304 may receive, through communications network 414, a data packet including an advertisement criterion to be used as user criterion and a period of time. Control circuitry 304 may use the advertisement criterion as the user criterion when process 800 is executed for the received period of time. For example, control circuitry 304 may receive, through the Internet, a data packet including an advertisement criterion "Pepsi" and a period of time "3 hours." Control circuitry 304 may store this data packet using storage circuitry 308. If process 800 is executed in the next three hours, control circuitry 304 select "Pepsi" to use as the user criterion.

In some embodiments, control circuitry 304 may use viewing data or user profiles from multiple devices to select the user criterion. In some embodiments, control circuitry 304 may execute process 800 using more than one user criterion. For example, control circuitry 304 may execute process 800 using user criterion "Dora the Explorer" based on previously accessed media content, and user criterion "PG" based on parental control settings.

At block 804, control circuitry 304 determines whether the user criterion is in a cache stored using storage circuitry 308. The cache may include a list of user criteria associated with respective characters. For example, control circuitry 304 may have stored the characters found when process 800 was executed previously in the cache. The cache may have a limited size. For example, the cache may only include five user criteria and five associated characters. In some embodiments, the cache may be stored locally using storage circuitry 308 to enable quick retrieval. If control circuitry 304 determines the user criterion is one of the user criteria in the cache, process 800 proceeds to block 806. Otherwise, process 800 proceeds to block 808.

At block 806, control circuitry 304 selects the character matching the previously selected character for the user criterion. For example, the cache may include information that the user criterion "Dora the Explorer" is associated with character "Dora" and "Scooby Doo" is associated with character "Scooby". Control circuitry 304 may have created these associations because character "Dora" was selected in a previous iteration of process 800 when "Dora the Explorer" was the user criterion, and character "Scooby" was selected in a previous iteration of process 800 when "Scooby Doo" was the user criterion.

Control circuitry 304 may have selected the user criterion "Dora the Explorer" at block 802. Control circuitry 304 may have determined that "Dora the Explorer" is in the cache at block 804. Control circuitry 306 may determine that user criterion "Dora the Explorer" is associated with character "Dora" in the cache, and hence select character "Dora" in the current iteration of process 800.

At block 808, control circuitry 304 compares the user criterion to attributes of all characters in a database. In some embodiments, the database may be stored in a remote location such as media content source 416 or media guidance data source 418 and accessed through communications network 414. In some embodiments, the database may be stored locally using storage circuitry 308. Control circuitry 304 may perform the comparison by sequentially comparing the user criterion to each attribute associated with each character in the database until a match is found. When a match is found, process 800 proceeds to block 810.

At block 810, control circuitry 304 selects the character found at block 808, with an attribute matching the user criterion. In some embodiments, control circuitry 304 may remove the oldest entry in the cache, and create a new entry with the user criterion and the selected character in the cache.

Figure 9:
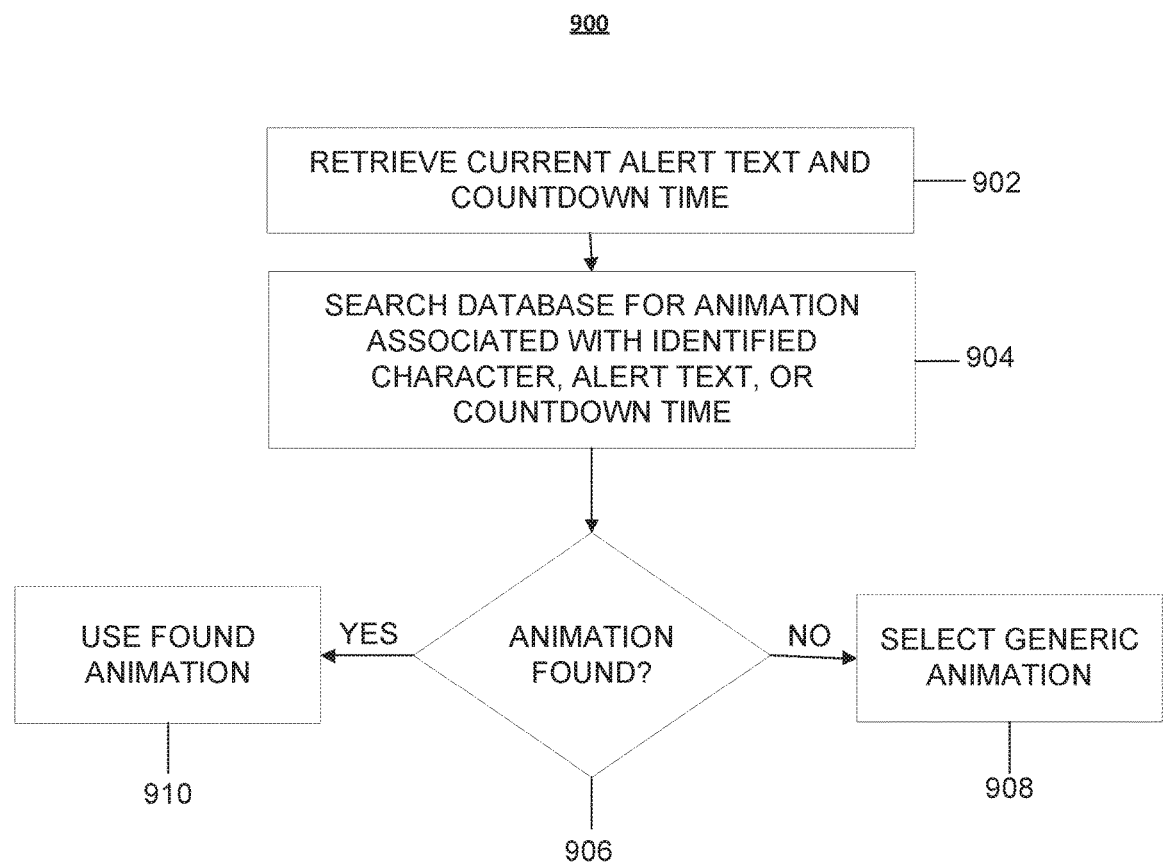
FIG. 9 shows an exemplary process for searching a database of a plurality of countdown animations to select a countdown animation associated with the identified character in accordance with some embodiments of the present disclosure.

FIG. 9 shows an exemplary process 900 for searching a database of a plurality of countdown animations to select a countdown animation associated with the identified character incorporating embodiments of the present disclosure. Process 900 may use the character identified by process 800 to search for an animation.

At block 902, control circuitry 304 retrieves alert text and the countdown time. In some embodiments, alert text may have been entered as a part of user preferences by parents and/or guardians using user input interface 310. For example, alert text may include alert text 504. In some embodiments, alert text may be optional. Countdown time may be the time determined by process 700. Countdown time may describe the amount of time remaining in the user selected period.

At block 904, control circuitry 304 searches a database for animation associated with the character and the alert text or countdown time. In some embodiments, the database may be stored in a remote location such as media content source 416 or media guidance data source 418 and accessed through communications network 414. In some embodiments, the database may be stored locally using storage circuitry 308. The database may store one or more animations for each character. For example, for the character "Dora," the database may include one animation to be used when less than ten minutes remain in the countdown, and one animation to be used when more than ten minutes remain in the countdown. In another example, for the character "Dora," the database may include one animation to be used when the alert text is associated with "homework time," and one animation to be used when the alert text is associated with "mealtime." Metadata associated with each animation may describe information about its associated character, alert text, and/or countdown time. In some embodiments, the database may also include default animations to be used when animations associated with a character, alert text, or countdown time cannot be found.

Control circuitry 304 may search the database by comparing the character, alert text, and countdown time with the metadata associated with each animation. Control circuitry 304 may iterate through all animations until a match is found.

At block 906, control circuitry 304 determines whether an animation was found. In some embodiments, control circuitry 304 may determine a match was found if an animation has metadata matching the identified character, alert text, and countdown time. In some embodiments, control circuitry 304 may determine a match was found if an animation has metadata matching one of the identified character, alert text, or countdown time. If control circuitry 304 determines a match was found, process 900 proceeds to block 908. If control circuitry 304 determines a match was not found, process 900 proceeds to block 910.

At block 908, control circuitry 304 selects a generic animation. In some embodiments, a generic advertisement may be associated with at least one of the identified character, alert text, or countdown time. In some embodiments, the generic animation may be associated with none of the identified character, alert text, or countdown time. In some embodiments, control circuitry 304 may use communications network 414 to send a message to a server that an animation was not found, so the server can collect statistics about situations in which animations were not found. The message to the server may include the identified character, alert text, and countdown time.

At block 910, control circuitry 304 uses the found animation. In some embodiments, control circuitry 304 may download the found animation from a remote server using communications network 414 and store it locally using storage circuitry 308. In some embodiments, control circuitry 304 may generate for display the found animation using display 312. In some embodiments, control circuitry 304 may generate for display alert text and/or the countdown time with the animation, as described in relation to FIG. 5.

Figure 10:
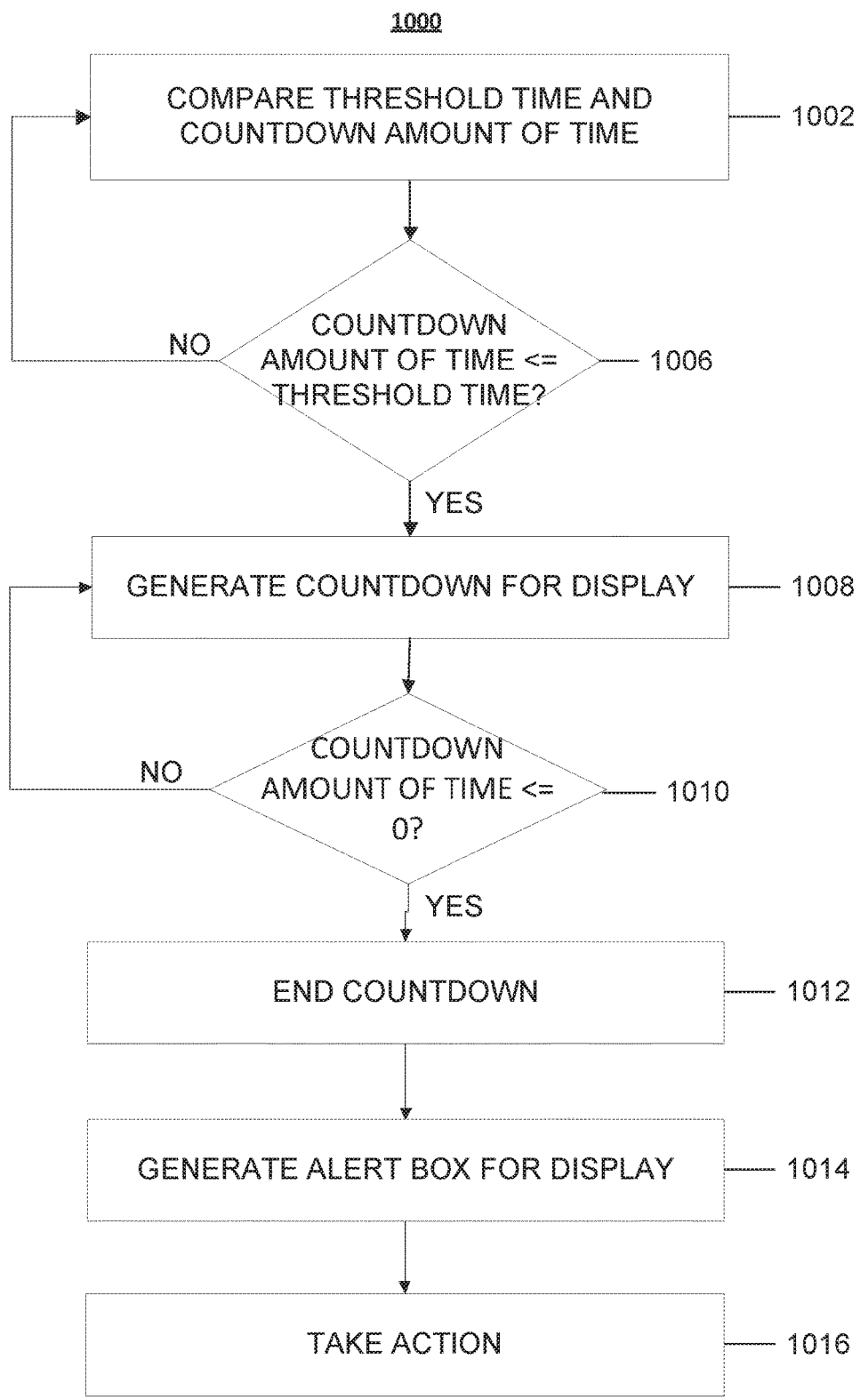
FIG. 10 shows an exemplary process for generating for display the selected countdown animation simultaneously with the media content in accordance with some embodiments of this disclosure.

FIG. 10 shows an exemplary process 1000 for generating for display the selected countdown animation simultaneously with the media content incorporating embodiments of this disclosure. The countdown animation may have been selected using process 900. The countdown animation may be associated with a character identified using process 800. Control circuitry 304 may continuously update the countdown amount of time using process 700 during process 1000.

At block 1002, control circuitry 304 compares a threshold time and the countdown amount of time. For example, control circuitry 304 may determine the countdown amount of time is eight minutes. This may represent the amount of time left in the viewing limit and may be computed using process 700. Control circuitry may retrieve a threshold time that is 10 minutes. The threshold amount of time may ensure that the countdown is only shown when the threshold amount of time remains in the countdown, and not for the duration of the entire viewing limit. For example, control circuitry 304 may use the threshold amount of time to ensure the countdown is only displayed during the last minute of the viewing limit period. Parents and/or guardians may be able to change the threshold time using the user input interface 310 to enter new user preferences.

At block 1006, control circuitry 304 may determine whether the countdown amount of time is less than or equal to the threshold time. If control circuitry 304 determines that the countdown of the amount of time is less than or equal to the threshold time, process 1000 proceeds to block 1008. Otherwise, process 1000 returns to block 1002, and control circuitry 304 updates the countdown amount of time using process 700.

At block 1008, control circuitry 304 generates for display the countdown using display 312. Control circuitry 304 may generate for display a countdown as shown in relation to FIG. 5.

At block 1010, control circuitry 304 determines whether the countdown amount of time is less than or equal to zero. If control circuitry 304 determines the countdown amount of time is less than or equal to zero, process 1000 proceeds to block 1012. Otherwise, process 1000 returns to block 1008.

At block 1012, control circuitry 304 ends the countdown. Control circuitry 304 may stop updating the countdown amount of time using process 700. Control circuitry 304 also stops generating for display the countdown. At block 1014, control circuitry 304 generates an alert box. For example, control circuitry 304 may generate for display an alert box as shown in relation to FIG. 6. In some embodiments, the alert box may include alert text. In some embodiments, the alert box may include an option to enter a parental code to remove the alert box and resume accessing the media asset.

At block 1016, control circuitry 304 takes an action associated with the countdown. The action may have been set by parents and/or guardians as part of user preferences. For example, the action may include turning off user devices currently being used by children, or user devices associated with the children. In some embodiments, the action may include sending the parents and/or guardians a notification that the children have reached their viewing limits.

Figure 11:
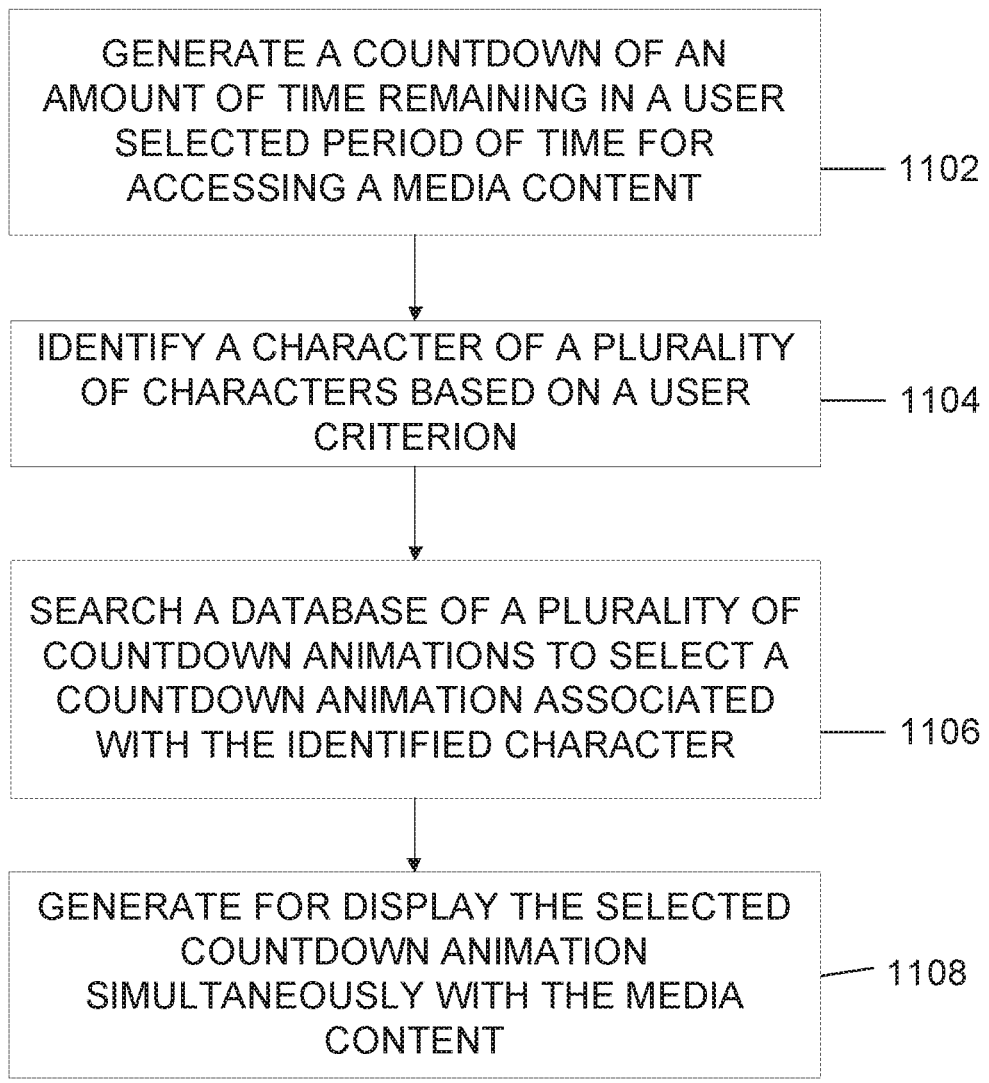
FIG. 11 shows an exemplary process for creating countdown animations in accordance with some embodiments of the present disclosure.

FIG. 11 shows an exemplary process 1100 for creating countdown animations incorporating embodiments of the present disclosure. At block 1102, control circuitry 304 generates a countdown of an amount of time remaining in a user selected period of time for accessing media content, as shown in relation to process 700. The user selected period of time may be the viewing limits set by the parents and/or guardians. For example, control circuitry 304 may determine that the current countdown amount of time is eight minutes. This may indicate eight minutes remain in the viewing limits set by the parents and/or guardians. Control circuitry may periodically execute process 700 to update the countdown amount of time.

At block 1104, control circuitry 304 identifies a character of a plurality of characters based on a user criterion, as shown in relation to process 800. For example, control circuitry 304 may determine that the children are currently watching the cartoon program "Dora the Explorer," and identify the character "Dora" based on this user criterion.

At block 1106, control circuitry 304 searches a database of a plurality of countdown animations to select a countdown animation associated with the identified character, as shown in relation to process 900. For example, control circuitry 304 may identify an animation associated with the character "Dora" and a countdown time of less than ten minutes. Control circuitry 304 may retrieve this program from a remote server using communications network 414, and store it locally using storage circuitry 308 for quick retrieval.

At block 1108, control circuitry 304 generates for display the selected countdown animation simultaneously with the media content, as shown in relation to process 1000. For example, control circuitry 304 may output on display 312 the animation identified at block 110. The media guidance application may generate for display the animation associated with the character "Dora" and a countdown time of less than ten minutes as discussed in relation to FIG. 5. Control circuitry 304 may also generate for display alert text and/or the countdown of the amount of time remaining in the user selected period. Control circuitry 304 may update the countdown time until it reaches zero, and then display an alert box as shown in relation to FIG. 6.

It should be noted that processes 700-1100, or any step thereof could be performed on, or provided by, the optimization system on any of the devices shown in FIGS. 3-4. For example, processes 700-1100 may be executed by processing circuitry 304 (FIG.3) as instructed by processing circuitry implemented on user equipment 402, 404, and/or 406 (FIG. 4) in order to provide information to a user. In addition, one or more steps of processes 700-1100 may be incorporated into or combined with one or more steps of any other process or embodiment.

It is contemplated that the steps or descriptions of FIGS. 7-11 may be used with any other embodiment of this disclosure. In addition, the steps and descriptions described in relation to FIGS. 7-11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of creating countdown animations, the method comprising:
    receiving, from a first user, text including a plurality of words representing a task to be started at a given time by a second user;
    generating a countdown of an amount of time remaining in a user selected period of time for accessing media content based on a difference between a current time and the given time;
    processing the text to select a word of the plurality of words associated with the task;
    identifying a character of a plurality of characters based on a user criterion by automatically determining one of the plurality of characters that is associated with the selected word associated with the task, wherein each of the plurality of characters is associated with a different type of task;
    searching a database of a plurality of countdown animations to select a countdown animation associated with the identified character; and
    generating for display to the second user the selected countdown animation simultaneously with the media content, wherein the selected countdown animation identifies the task to be started by the second user at the end of the countdown of the amount of time.

2. The method of claim 1, further comprising generating for display the countdown of the amount of time remaining in the user selected period.

3. The method of claim 1, wherein the identifying further comprises:
    comparing an attribute associated with each character of the plurality of characters to the user criterion; and
    selecting the character of the plurality of characters associated with an attribute matching the user criterion.

4. The method of claim 1, wherein the identifying further comprises:
    searching user criteria associated with each of previously selected characters of the plurality of characters; and
    selecting the character of the previously selected characters associated with an attribute matching the user criterion.

5. The method of claim 1, wherein the user criterion is one of an attribute of a user profile, an identifier of the media content, or an attribute of previously entered user preferences.

6. The method of claim 1, further comprising performing a user-selected action at an end of the countdown of the amount of time remaining in the user selected period of time.

7. The method of claim 6, wherein the action comprises generating for display an alert box with a reminder.

8. The method of claim 6, wherein the action comprises locking the media content and generating for display a parental control lock screen.

9. The method of claim 1, wherein the generating for display further comprises generating for display the selected countdown animation as an overlay on the media content, side-by-side with the media content, or simultaneously with a soundtrack associated with the selected countdown animation.

10. The method of claim 1, wherein the generating for display the selected countdown animation further comprises:
    comparing the countdown of the amount of time remaining in the user selected period of time to a threshold time; and
    generating for display the selected countdown animation in response to determining that the countdown of the amount of time is less than the threshold time.

11. The method of claim 1, wherein searching the database of the plurality of countdown animations to select the countdown animation associated with the identified character comprises: selecting the countdown animation from a plurality of candidate countdown animations associated with the identified character based on an identity of the task.

12. A system for creating countdown animations, the system comprising:
    storage circuitry that stores text received from a first user including a plurality of words representing a task to be started at a given time by a second user; and
    control circuitry that:
        generates a countdown of an amount of time remaining in a user selected period of time for accessing media content based on a difference between a current time and the given time;
        processes the text to select a word of the plurality of words associated with the task;
        identifies a character of a plurality of characters based on a user criterion by automatically determining one of the plurality of characters that is associated with the selected word associated with the task, wherein each of the plurality of characters is associated with a different type of task;
        searches a database of a plurality of countdown animations to select a countdown animation associated with the identified character; and
        generates for display to the second user the selected countdown animation simultaneously with the media content, wherein the selected countdown animation identifies the task to be started by the second user at the end of the countdown of the amount of time.

13. The system of claim 12, wherein the control circuitry generates for display the countdown of the amount of time remaining in the user selected period.

14. The system of claim 12, wherein the control circuitry:
compares an attribute associated with each character of the plurality of characters to the user criterion; and
selects the character of the plurality of characters associated with an attribute matching the user criterion.

15. The system of claim 12, wherein the control circuitry:
searches user criteria associated with each of previously selected characters of the plurality of characters; and
selects the character of the previously selected characters associated with an attribute matching the user criterion.

16. The system of claim 12, wherein the user criterion is one of an attribute of a user profile, an identifier of the media content, or an attribute of previously entered user preferences.

17. The system of claim 12, wherein the control circuitry performs a user-selected action at an end of the countdown of the amount of time remaining in the user selected period of time.

18. The system of claim 17, wherein the action comprises generating for display an alert box with a reminder.

19. The system of claim 17, wherein the action comprises locking the media content and generating for display a parental control lock screen.

20. The system of claim 12, wherein the control circuitry generates for display the selected countdown animation as an overlay on the media content, side-by-side with the media content, or simultaneously with a soundtrack associated with the selected countdown animation.

21. The system of claim 12, wherein the control circuitry:
compares the countdown of the amount of time remaining in the user selected period of time to a threshold time; and
generates for display the selected countdown animation in response to determining that the countdown of the amount of time is less than the threshold time.

22. The system of claim 12, wherein the control circuitry is further configured, when searching the database of the plurality of countdown animations to select the countdown animation associated with the identified character, to: select the countdown animation from a plurality of candidate countdown animations associated with the identified character based on an identity of the task.

* * * * *